United States Patent
Choi et al.

(10) Patent No.: US 9,843,424 B2
(45) Date of Patent: Dec. 12, 2017

(54) MITIGATING THE IMPACT OF TRANSMIT BLANKING DURING UPLINK COMMUNICATIONS

(71) Applicant: QUALCOMM Incorporated, San Diego, CA (US)

(72) Inventors: Zae Yong Choi, San Jose, CA (US); Omesh Kumar Handa, Carlsbad, CA (US); Yuan Wang, San Diego, CA (US); Rami Alnatsheh, San Diego, CA (US); Syam Pavan Vadapalli, San Diego, CA (US); Murali Paravath Menon, Acton, MA (US)

(73) Assignee: QUALCOMM Incorporated, San Diego, CA (US)

(*) Notice: Subject to any disclaimer, the term of this patent is extended or adjusted under 35 U.S.C. 154(b) by 79 days.

(21) Appl. No.: 15/000,973

(22) Filed: Jan. 19, 2016

(65) Prior Publication Data

US 2016/0315744 A1 Oct. 27, 2016

Related U.S. Application Data

(60) Provisional application No. 62/153,361, filed on Apr. 27, 2015.

(51) Int. Cl.
*H04L 5/00* (2006.01)
*H04L 1/18* (2006.01)
*H04W 72/04* (2009.01)

(52) U.S. Cl.
CPC .......... *H04L 5/0048* (2013.01); *H04L 1/1825* (2013.01); *H04L 1/1887* (2013.01); *H04L 5/0055* (2013.01); *H04W 72/0406* (2013.01)

(58) Field of Classification Search
CPC ... H04L 5/0048; H04L 1/1825; H04L 1/1887; H04L 5/0055; H04W 72/0406
See application file for complete search history.

(56) References Cited

U.S. PATENT DOCUMENTS

2013/0194994 A1  8/2013  Dayal et al.
2014/0293912 A1  10/2014 Chao et al.

OTHER PUBLICATIONS

International Search Report and Written Opinion—PCT/US2016/026666—ISA/EPO—dated Jul. 1, 2016. 14 Total Pages.

*Primary Examiner* — Ronald B Abelson
(74) *Attorney, Agent, or Firm* — Arent Fox LLP

(57) ABSTRACT

Aspects of mitigating throughput degradation during wireless communication include determining that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy; determining whether a first retransmission signal for the first transmission signal fails decoding at the network entity; and retransmitting the first transmission signal as a new transmission signal when a determination is made that the first retransmission signal for the first transmission signal fails decoding at the network entity.

26 Claims, 3 Drawing Sheets ial Application No. 62/153,361 entitled "MITI-
MITIGATING THE IMPACT OF TRANSMIT BLANKING DURING UPLINK COMMUNICATIONS

CLAIM OF PRIORITY UNDER 35 U.S.C. §119

The present Application for Patent claims priority to U.S. Provisional Application No. 62/153,361 entitled "MITIGATING THE IMPACT OF TRANSMIT BLANKING DURING UPLINK COMMUNICATIONS" filed Apr. 27, 2015, which is assigned to the assignee hereof and hereby expressly incorporated by reference herein.

BACKGROUND

Aspects of the present disclosure relate generally to wireless communication systems, and particularly to mitigating throughput degradation during wireless communication.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Recent advancements in wireless communication have enabled user equipment (UE) to support dual subscriber identity module (SIM) dual active (DSDA) operations. DSDA allows a user to maintain two active connections to two different subscriptions, which may be to different radio access technologies (RATs) or networks, or a same RAT or network. Providing the perfect multitasking user experience, the simultaneous connection capability of DSDA allows users to browse the web or download files on one network while they are on a voice call at the same time. For example, a UE may operate in GSM mode for voice calls and WCDMA mode for data communications (e.g., web browser). However, as part of the regular signaling procedure, the UE may turn off or disable transmitting on WCDMA mode during GSM mode transmissions.

Therefore, enhancements to mitigating throughput degradation during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method relates to mitigating throughput degradation during wireless communications. The described aspects include determining that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy. The described aspects further include determining whether a first retransmission signal for the first transmission signal fails decoding at the network entity. The described aspects further include retransmitting the first transmission signal as a new transmission signal when a determination is made that the first retransmission signal for the first transmission signal fails decoding at the network entity.

In another aspect, a present computer-readable medium storing computer executable code relates to mitigating throughput degradation during wireless communications. The described aspects include code for determining that a first transmission signal fails decoding at a network entity due to TX blanking when a UE supports DSDA and is operating in HARQ with incremental redundancy. The described aspects further include code for determining whether a first retransmission signal for the first transmission signal fails decoding at the network entity. The described aspects further include code for retransmitting the first transmission signal as a new transmission signal when a determination is made that the first retransmission signal for the first transmission signal fails decoding at the network entity.

In a further aspect, a present apparatus relates to mitigating throughput degradation during wireless communications. The described aspects include means for determining that a first transmission signal fails decoding at a network entity due to TX blanking when a UE supports DSDA and is operating in HARQ with incremental redundancy. The described aspects further include means for determining whether a first retransmission signal for the first transmission signal fails decoding at the network entity. The described aspects further include means for retransmitting the first transmission signal as a new transmission signal when a determination is made that the first retransmission signal for the first transmission signal fails decoding at the network entity.

In another aspect, a present apparatus relates to mitigating throughput degradation during wireless communications. The described aspects include a memory configured to store data, and one or more processors communicatively coupled with the memory, wherein the one or more processors and the memory are configured to determine that a first transmission signal fails decoding at a network entity due to TX blanking when a UE supports DSDA and is operating in HARQ with incremental redundancy. The described aspects further determine whether a first retransmission signal for the first transmission signal fails decoding at the network entity. The described aspects further retransmit the first transmission signal as a new transmission signal when a determination is made that the first retransmission signal for the first transmission signal fails decoding at the network entity Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof The drawings include like reference numbers for like elements, and may represent optional components or actions using dashed lines.

DETAILED DESCRIPTION

Figure 1:
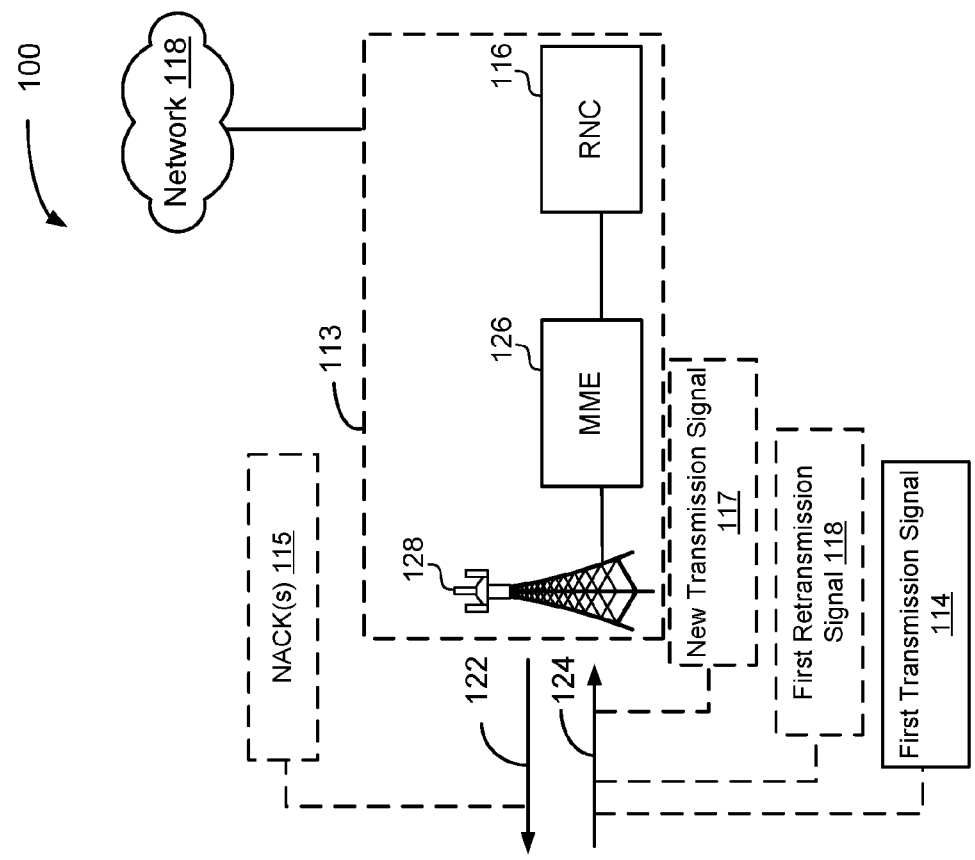
FIG. 1 is a schematic diagram of a wireless communications system including a user equipment having an aspect of a UE mitigation component for mitigating throughput degradation.
Figure 1:
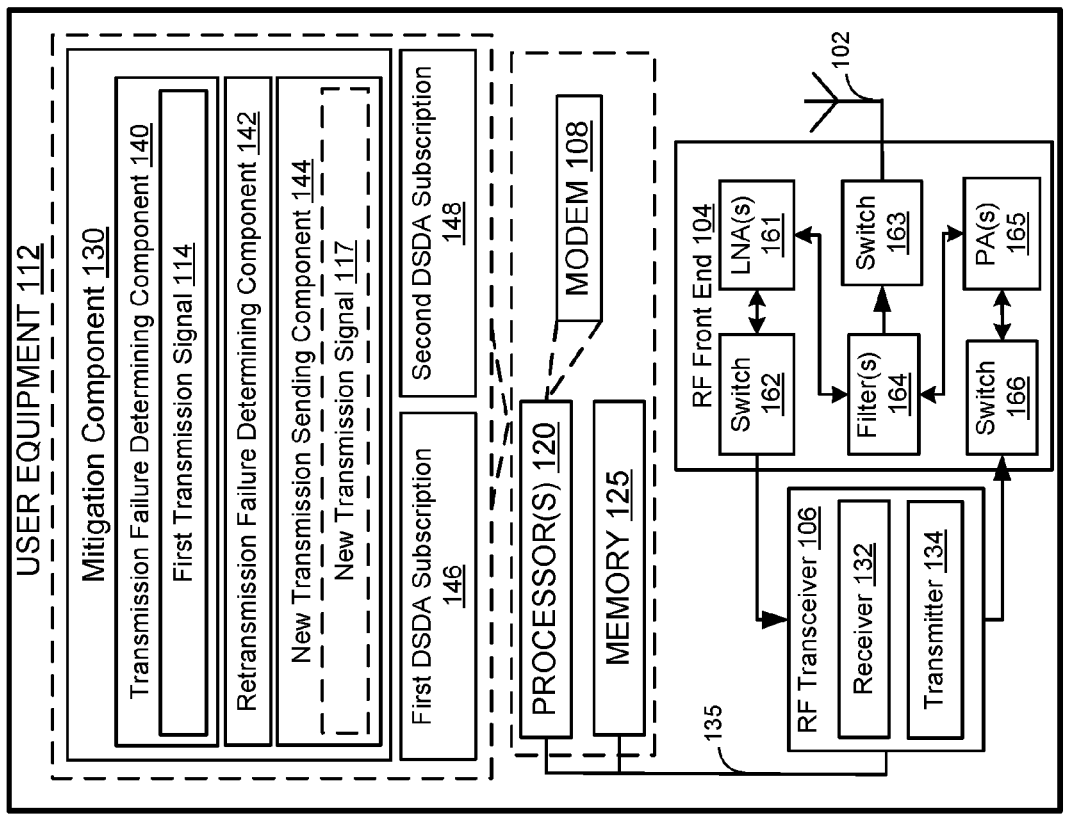

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be hardware, firmware, and/or software, and may be divided into other processors.

The present disclosure provides for an enhanced or improved procedure for mitigating throughput degradation during wireless communication. For example, during DSDA operations, a UE may operate in two different modes: a GSM mode for voice calls and a WCDMA mode for data communications (e.g., web browser). As such, the UE may be in the process of transmitting a WCDMA communication while simultaneously transmitting in GSM mode. As a result, TX blanking may occur, which involves stopping WCDMA transmissions for a period of time during GSM transmissions. For instance, in an example, GSM is a time division multiple access (TDMA) operation, so the UE only needs to transmit on one time slot. Therefore, during GSM transmissions, WCDMA transmissions are stopped, e.g., blanked, for one time slot.

For example, for any first enhanced dedicated channel (EDCH) transmission from the UE to a network entity, the network entity may request retransmission of the incorrectly received data packets (e.g., unsuccessfully decoded data packets) of the first EDCH transmission by means of transmitting negative acknowledgements (NACKs) to the UE. As such, for the corresponding hybrid automatic repeat request (HARQ), the UE may be configured to retransmit the data packets of the first EDCH transmission. For instance, in an example, the network entity may soft combine the retransmission of the first EDCH transmission with the original transmission to increase the likelihood that the packet can be decoded correctly. HARQ with soft combining may be performed using chase combining (e.g., each retransmission includes the same information) or using incremental redundancy (e.g., each retransmission includes different information).

Further, in a DSDA scenario with TX blanking on the WCDMA subscription, incremental redundancy may be configured by the network for enhanced uplink (EUL) transmission. As noted above, incremental redundancy may correspond to a soft combining method where every retransmission contains different information than the previous one. Multiple sets of coded bits are generated, each representing the same set of information bits. The retransmission typically uses a different set of coded bits than the previous transmission, with different redundancy versions generated by puncturing the encoder output. Thus, at every re-transmission the receiver gains extra information. If the first EDCH transmission has failed due to TX blanking, the chance of failure for the rest of HARQ retransmissions (e.g., residual block error rate (BLER)) is quite high because of the periodicity of TX blanking (e.g., 4.615 ms). As a result, this residual BLER is a contributing factor to throughput degradation of EUL transmissions.

As such, the present methods and apparatus may alter the transmission scheme of HARQ retransmissions in order to mitigate throughput degradation during wireless communications. Accordingly, in some aspects, the present methods and apparatus may provide an efficient solution, as compared to current solutions, for example, to enable the UE to properly determine that a first EDCH transmission on a HARQ fails due to TX blanking during DSDA operations, and that a first retransmission of the first EDCH transmission also fails. As a result, the UE may cancel any subsequent retransmissions and retransmit the first transmission as a new transmission.

Referring to FIG. 1, in an aspect, a wireless communications system 100 includes at least one UE 112 in communication coverage of at least one network entity 113 (e.g., base station or node B). UE 112 can communicate with a network 118 via network entity 113, which may include a base station 128, mobility management entity (MME) 126, and/or a radio network controller (RNC) 116. In an aspect, UE 112 may include one or more processors 120 and, optionally, memory 125, that may operate in combination with mitigation component 130 to mitigate throughput degradation during wireless communication. In other words, UE 112 operating in a DSDA mode may alter the transmission scheme of HARQ retransmissions in order to mitigate throughput degradation during wireless communications caused by TX blanking on the WCDMA subscription by preventing repeated retransmissions of a first retransmission signal, and instead transmitting a new transmission signal corresponding to a first transmission signal. For example, during HARQ transmissions utilizing incremental redundancy, mitigation component 130 may recognize that subsequent retransmissions with incremental redundancy have a low probability of being decoded when an initial transmission signal fails due to TX blanking and a first retransmission signal with incremental redundancy also fails. As such, mitigation component 130 alters the transmission scheme of the HARQ process with incremental redundancy to subsequently retransmit the first transmission signal as a new transmission signal at the next retransmission opportunity, e.g., the next HARQ occasion. Accordingly, the present aspects may reduce throughput degradation, as UE 112 implementing the present aspects during DSDA scenarios when there is TX blanking and incremental redundancy configured does not have to wait until a maximum number of retransmissions have been completed, but can initiate a new transmission when a first transmission fails due to TX blanking and the following first retransmission also fails.

In an aspect, the network entity 113 may be a base station such a NodeB in an UMTS network. UE 112 may communicate with a network 118 via network entity 113 and a RNC 116. In some aspects, multiple UEs including UE 112 may be in communication coverage with one or more network entities, including network entity 113. In an example, UE 112 may transmit and/or receive wireless communications 20 to and/or from network entity 113. Network entity 113 may be and/or include a base station 128, a radio network controller (RNC) 116, or a mobile management entity (MME) 126 depending on the radio access technology (RAT) type (e.g., WCDMA or LTE) and/or the configuration of the network. In some aspects, UE 112 may communicate with network entity 113 using a first DSDA subscription 146 and/or a second DSDA subscription 148. In these aspects, the first DSDA subscription 146 may be associated with a first RAT, such as but not limited to a WCDMA network, and the second DSDA subscription 148 may be associated with a second RAT, such as but not limited to a GSM network. In some aspects, wireless communication system 100 may include more than one network entity, each corresponding to a RAT. For example, wireless communication system 100 may a second network entity corresponding to a second RAT.

In some aspects, UE 112 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 112 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, network entity 113 may be a macrocell, picocell, femtocell, relay, Node B, mobile Node B, UE (e.g., communicating in peer-to-peer or ad-hoc mode with UE 112), or substantially any type of component that can communicate with UE 112 to provide wireless network access at the UE 112.

The wireless communications between the UE 112 and the network entity 113 may include signals transmitted by either the network entity 113 or the UE 112. The wireless communications may include downlink channels 122 transmitted by network entity 113 and uplink channels 124 transmitted by UE 112. For example, the network entity 113 may transmit one or more downlink channels 122 such as, but not limited to, a High-Speed Shared Control Channel (HS-SCCH), a high-speed downlink shared channel (HS-DSCH), high-speed physical downlink shared channel (HS-PDSCH), downlink dedicated physical control channel (DL-DPCCH), a fractional dedicated physical channel (F-DPCH), or Hybrid Automatic Repeat Request (HARQ) Indicator Channel (HICH). Further, for example, UE 112 may transmit uplink channel 124 such as, but not limited to, uplink High Speed-Dedicated Physical Control Channel (HS-DPCCH).

In an aspect, UE 112 may support DSDA operations. As such, UE 112 may operate in GSM mode for voice calls and WCDMA mode for data communications (e.g., web browser). UE 112 may configure RF transceiver 106 and/or transmitter 134 to transmit a first transmission signal 114 via uplink channel 124 to network entity 113. For example, in an aspect, the first transmission signal 114 may be an enhanced dedicated channel (EDCH) transmission. The first transmission signal 114 may include a systematic bit corresponding to a bit on an enhanced dedicated physical control channel (E-DPCCH) indicating that the first transmission signal 114 is a new transmission and not a retransmission. However, since UE 112 is operating in DSDA configuration, TX blanking may occur. TX blanking may involve stopping, turning off, or disabling WCDMA transmissions (e.g., corresponding to the first DSDA subscription 146) for a period of time during which GSM transmissions take place. For instance, in an example, GSM is a time division multiple access (TDMA) operation, so the UE only needs to transmit on one time slot. Therefore, during GSM transmissions, WCDMA transmissions are stopped for one time slot. For example, a UE operating on both WCDMA and GSM is supposed to transmit data packets continuously before, during, and after an active call, but the transmission of the data packets are cut off during the active call due to TX blanking. As such, the first EDCH transmission signal transmitted by UE 112 to network entity 113 may have failed to have been properly received (e.g., decoding failure) by the network entity 113 due to the TX blanking. For example, for any first EDCH transmission from the UE 112 to network entity 113, the network entity 113 may request retransmission of the incorrectly received data packets of the first EDCH transmission by means of transmitting negative acknowledgements (NACKs) 115 to the UE 112. UE 112, mitigation component 130, and/or transmission failure determining component 140 may determine that a first transmission signal 114 fails due to TX blanking while UE 112 is operating in DSDA mode with incremental redundancy.

In an aspect, UE 112 may begin a retransmission procedure for the first EDCH transmission signal in response to receiving a NACK from network entity 113. For instance, in an example, the retransmission procedure may include sending retransmission signals corresponding to the first EDCH transmission signal to the network entity 113. UE 112 may be configured to use HARQ incremental redundancy for these retransmissions. For each transmitted data packet, UE 112 sends a retransmission sequence number (RSN) on the E-DPCCH. For instance, in an example, the RSN may be a two bit value. For example, the first retransmission may have the RSN set to one, and if the first retransmission fails (e.g., UE 112 receives a NACK 115 in response to the first retransmission) then the second retransmission may have the RSN set to two. Therefore, after the third retransmission (if the first two retransmission attempts have failed), the RSN is not incremented anymore and the data packets have RSN maintain its value at three. To each retransmission level, a certain redundancy version is associated which is also influenced by the coding rate, and for RSN set to 3 also by the transmission time interval (TTI) number. Each redundancy version represents a certain s and r parameter combination. Together, s and r clearly define the selection of bits that can be transmitted on the air interface resource, i.e. the rate matching pattern. Due to these fixed rules, it is not necessary to signal the redundancy version in the uplink on E-DPCCH. Only the RSN is signaled on E-DPCCH, as well as the enhanced transport format combination indicator (E-TFCI) which is used to derive the coding rate.

For instance, in an example, UE 112, mitigation component 130, and/or retransmission failure determining component 142 may determine whether a first retransmission signal 118 for the first transmission signal 114 fails to be properly received by network entity 113. The determination is made based on whether a NACK is received on DL 122 from network entity 113 in response to the first retransmission signal 118 be sent on UL 124. If the first retransmission signal 118 is properly received then UE 112 may be configured to continue operating normally since the failure of the first transmission signal being properly received has been resolved.

In an aspect, UE 112, mitigation component 130, and/or new transmission sending component 144 may retransmit the first transmission signal 114 as a new transmission signal 117 based on the determination that the first retransmission signal 118 for the first transmission signal 114 fails to be properly received by the network entity 113. For instance, in an example, the new transmission signal 117 may be transmitted in a next HARQ occasion, and may include a systematic bit corresponding to a bit on an E-DPCCH indicating that the new transmission signal 117 is a new transmission and not a retransmission. Systematic bits are the original data bits that are input into the encoder (not shown) located at the network entity 113 in order to signal that the transmission signal being sent is a new transmission signal 117 and not a retransmission signal. As such since these systematic bits are being sent the network entity 113 may properly receive and decode the packet data units of the transmission signal.

Further, in addition to retransmitting the first transmission signal 114 as a new transmission signal 117, UE 112, mitigation component 130, and/or new transmission sending component 144 may prevent transmission of the plurality of potential retransmission signals in response to determining that the first retransmission signal 118 for the first transmission signal 114 fails. For instance, in an example, the retransmission procedure that began after the first EDCH transmission signal failed may be cancelled in order to prevent any potential retransmissions from being sent to network entity 113 as they are no longer necessary.

Moreover, in an aspect, UE 112 may include RF front end 104 and transceiver 106 for receiving and transmitting radio transmissions, for example, wireless communications transmitted by the network entity 113. In an aspect, transceiver 106 may include at least one transmitter 134 and at least one receiver 132. For example, transceiver 106 may include receiver 132 for receiving one or more NACKs 115 on the HS-SCCH (e.g., downlink channel 122) transmitted by the network entity 113. For example, transceiver 106 may include transmitter 134 and communicate with modem 108 to transmit messages generated by mitigation component 130 and to receive messages and forward them to mitigation component 130.

RF front end 104 may be connected to one or more antennas 102 and can include one or more low-noise amplifiers (LNAs) 161, one or more switches 162, 163, 165, one or more power amplifiers (PAs) 165, and one or more filters 164 for transmitting and receiving RF signals on the uplink channels 124 and downlink channels 22. In an aspect, components of RF front end 104 can connect with transceiver 106. Transceiver 106 may connect to one or more modems 108 and processor 120.

In an aspect, LNA 161 can amplify a received signal at a desired output level. In an aspect, each LNA 161 may have a specified minimum and maximum gain values. In an aspect, RF front end 104 may use one or more switches 162, 163 to select a particular LNA 161 and its specified gain value based on a desired gain value for a particular application.

Further, for example, one or more PA(s) 165 may be used by RF front end 104 to amplify a signal for an RF output at a desired output power level. In an aspect, each PA 165 may have a specified minimum and maximum gain values. In an aspect, RF front end 104 may use one or more switches 163, 166 to select a particular PA 165 and its specified gain value based on a desired gain value for a particular application.

Also, for example, one or more filters 164 can be used by RF front end 104 to filter a received signal to obtain an input RF signal. Similarly, in an aspect, for example, a respective filter 164 can be used to filter an output from a respective PA 165 to produce an output signal for transmission. In an aspect, each filter 164 can be connected to a specific LNA 161 and/or PA 165. In an aspect, RF front end 104 can use one or more switches 162, 163, 166 to select a transmit or receive path using a specified filter 164, LNA, 161, and/or PA 165, based on a configuration as specified by transceiver 106 and/or processor 120.

Transceiver 106 may be configured to transmit and receive wireless signals through antenna 102 via RF front end 104. In an aspect, transceiver may be tuned to operate at specified frequencies such that UE 112 can communicate with, for example, network entity 113. In an aspect, for example, modem 108 can configure transceiver 106 to operate at a specified frequency and power level based on the UE configuration of the UE 112 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 112 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 112 as provided by the network during cell selection and/or cell reselection.

UE 112 may further include a memory 125, such as for storing data used herein and/or local versions of applications or mitigation component 130 and/or one or more of its subcomponents being executed by processor 120. Memory 125 can include any type of computer-readable medium usable by a computer or processor 120, such as random access memory (RAM), read only memory (ROM), tapes, magnetic discs, optical discs, volatile memory, non-volatile memory, and any combination thereof. In an aspect, for example, memory 125 may be a computer-readable storage medium that stores one or more computer-executable codes defining mitigation component 130 and/or one or more of its subcomponents, and/or data associated therewith, when UE 112 is operating processor 120 to execute mitigation component 130 and/or one or more of its subcomponents.

Figure 2:
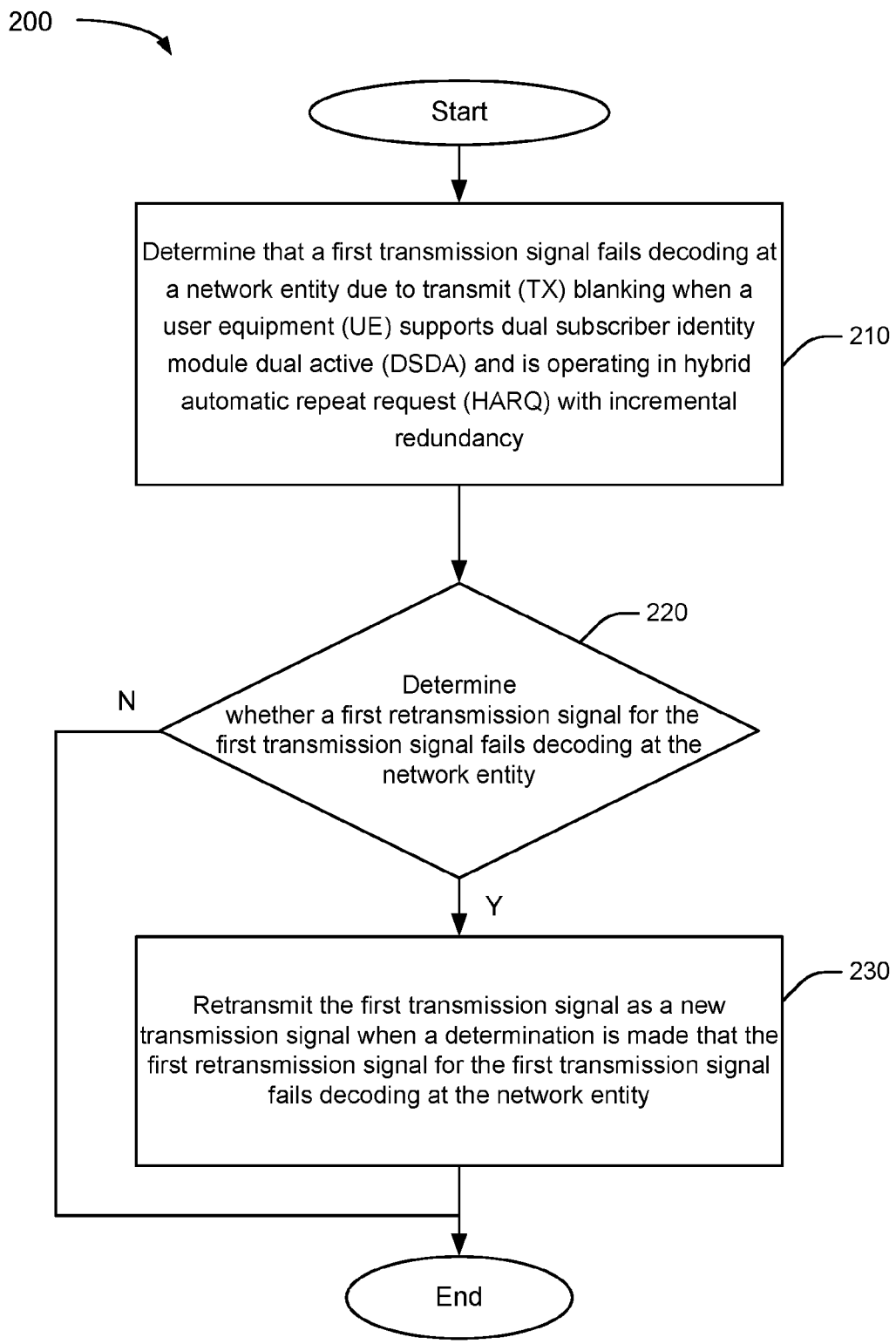
FIG. 2 is a flow diagram of an aspect of mitigating throughput degradation, which may be executed by the mitigation component of the user equipment of FIG. 1.

Referring to FIG. 2, a UE such as UE 112 (FIG. 1) may include one or more processors 120 to perform an aspect of a method 200 for mitigating throughput degradation during wireless communication. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 210, the method 200 may include determining that a first transmission signal fails decoding at a network entity due to TX blanking when a UE supports DSDA and is operating in HARQ with incremental redundancy. For example, in an aspect, UE 112, mitigation component 130, and/or transmission failure determining component 140 may determine that a first transmission signal 114 fails decoding at a network entity 113 due to TX blanking when UE 112 supports DSDA and is operating in HARQ with incremental redundancy. For instance, in an example, UE 112 may send a first transmission signal 114 on uplink channel 124 to network entity 113. The first transmission signal 114 may correspond to a first EDCH transmission signal on a HARQ.

For instance, when UE 112 transmits a first EDCH transmission signal on a HARQ, UE 112, mitigation component 130, and/or transmission failure determining component 140 may determine that the first EDCH transmission signal fails due to TX blanking on the second DSDA subscription 148 due to the ongoing transmission of signals on the first DSDA subscription 146 upon receiving a NACK 115 from the network entity 113 in response to transmitting the first EDCH transmission signal. In some aspects, mitigation component 130 and/or transmission failure determining component 140 determines that the failure has occurred due to TX blanking based on establishing which transmission time intervals (TTIs) of the Enhanced Dedicated Channel (EDCH) have experienced degradation and/or suffered.

In an aspect, at block 220, the method 200 may include determining whether a first retransmission signal for the first transmission signal fails decoding at the network entity. For example, in an aspect, UE 112, mitigation component 130, and/or retransmission failure determining component 142 may determine whether a first retransmission signal 118 for the first transmission signal 114 fails decoding at the network entity 113.

In an aspect, UE 112 may begin a retransmission procedure for the first EDCH transmission signal in response to receiving a NACK 115 from network entity 113. For instance, in an example, the retransmission procedure may include sending one or more retransmission signals corresponding to the first EDCH transmission signal to the network entity 113. UE 112 may be configured in incremental redundancy for these retransmissions. As such, if UE 112, mitigation component 130, and/or retransmission failure determining component 142 determines that a first retransmission signal 118 for the first transmission signal 114 fails, method 200 may proceed to block 230. In another aspect, if UE 112, mitigation component 130, and/or retransmission failure determining component 142 determines that a first retransmission signal 118 for the first transmission signal 114 does not fail, method 200 may end.

In an aspect, at block 230, the method 200 may include retransmitting the first transmission signal as a new transmission signal when a determination is made that the first retransmission signal for the first transmission signal fails decoding at the network entity. For example, in an aspect, UE 112, mitigation component 130, and/or new transmission sending component 144 may retransmit the first transmission signal 114 as a new transmission signal 117 when a determination is made that the first retransmission signal 118 for the first transmission signal 114 fails decoding at the network entity 113. For instance, in an example, the new transmission signal 117 may be transmitted in a next HARQ occasion, and may include a systematic bit corresponding to a bit on an E-DPCCH indicating that the new transmission signal 117 is a new transmission and not a retransmission. In some aspects, the retransmission failure may be due to the high frequency of TX blanking which causes the retransmissions to be cut off from transmitting. In other aspects, the retransmission failure may also be due to not enough information being received in the first transmission signal so the soft combining with the retransmission signal does not work properly.

For instance, in an example, UE 112, mitigation component 130, and/or new transmission sending component 144 may prevent transmission of any additional retransmission signals after the first retransmission signal 118 when the determination is made that the first retransmission signal 118 for the first transmission signal 114 fails decoding at the network entity 113. For instance, in an example, the retransmission procedure that began after the first EDCH transmission signal failed may be cancelled in order to prevent any potential retransmission from being sent to network entity 113.

Figure 3:
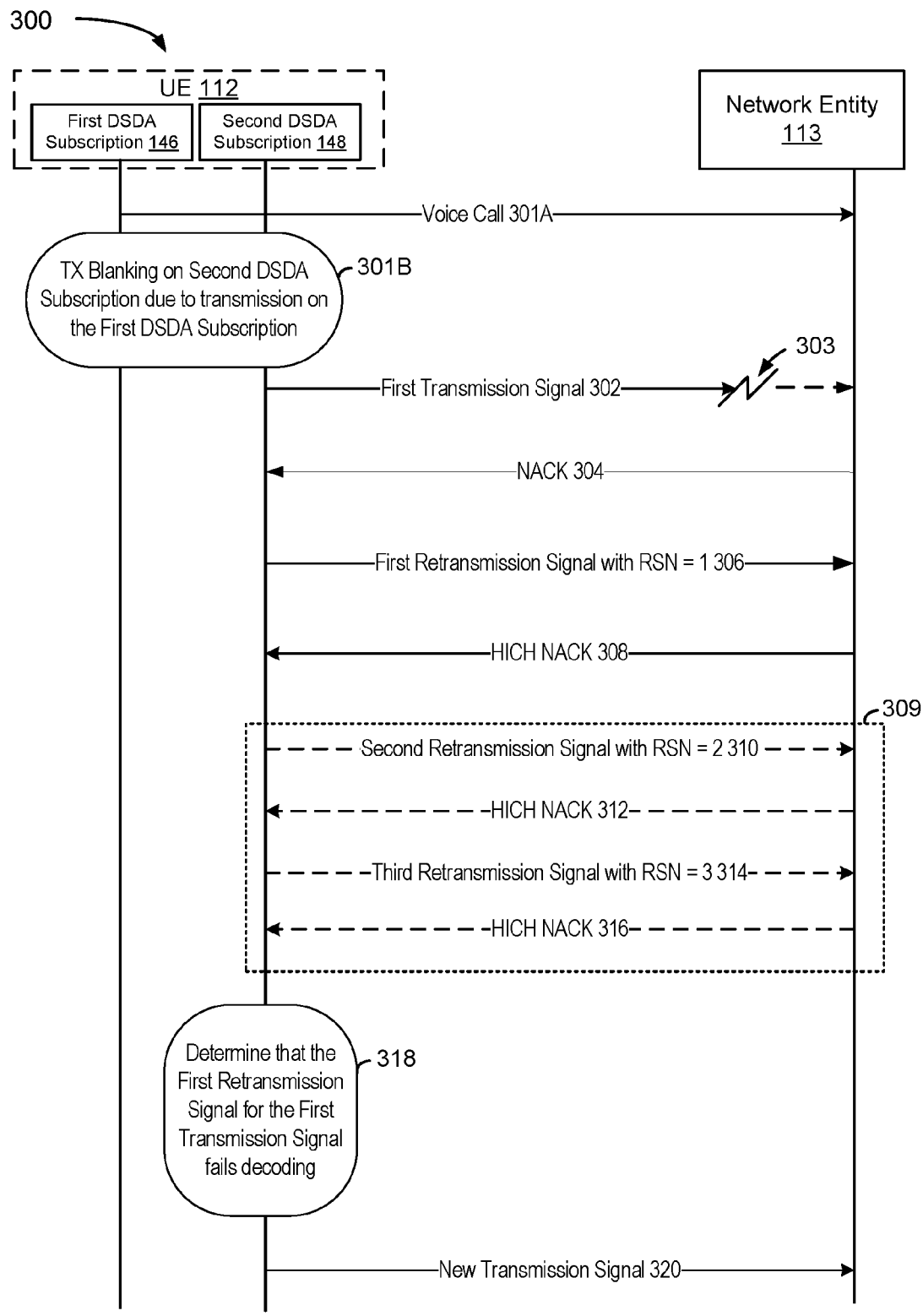
FIG. 3 is diagram illustrating an aspect for mitigating throughput degradation in accordance with various aspects of the present disclosure.

Referring to FIG. 3, in operation, signaling chart 300 illustrates signaling for mitigating throughput degradation during wireless communication between a UE and a network entity. In an aspect, signaling chart 300 illustrates an example implementation of method 200 of FIG. 2. In some aspects, the signaling chart illustrates the signaling between UE 112 and network entity 113. The UE may be located within a wireless communication system, such as wireless communication system 100 (FIG. 1). The UE may correspond to a UE, such as UE 112 (FIG. 1), and may include one or more processor(s), such as processor(s) 120, and/or memory 125 (FIG. 1) configured to execute a mitigation component 130. Additionally, UE 112 may include first DSDA subscription 146 and second DSDA subscription 148, as shown in FIG. 1.

While, for purposes of simplicity of explanation, the steps herein are shown and described as a series of acts, it is to be understood and appreciated that the steps are not limited by the order of acts, as some acts may, in accordance with one or more aspects, occur in different orders and/or concurrently with other acts from that shown and described herein. For example, it is to be appreciated that the steps could alternatively be represented as a series of interrelated states or events, such as in a state diagram. Moreover, not all illustrated acts may be required to implement a step in accordance with one or more features described herein.

Referring to FIG. 3, signaling chart 300, in an aspect, at 301A, UE 112 and/or first DSDA subscription 146 may begin transmission of a voice call on the first subscription (e.g., GSM). At 301B, due to the transmission of the voice call at 301A, UE 112 may TX blank transmissions on the second DSDA subscription due to transmission on the first DSDA subscription. As a result, at 302, UE 112 may transmit first transmission signal 114 to network entity 113 on an uplink channel. In an aspect, network entity 113 may not be able to properly decode the first transmission signal 114 due to TX blanking causing the first transmission signal 114 to not reach the network entity 113 at 303, and, as such, at 304, transmits a NACK signal 115. e.g., a HICH NAK, to UE 112 on a downlink channel to indicate that network entity 113 failed to decode the first transmission signal. In this aspect, UE 112 may establish that it supports DSDA and is operating in HARQ with incremental redundancy. As such, at 306, UE 112 may transmit a first retransmission signal with RSN set to 1 to network entity 113. Once again, network entity 113 may fail to decode the signal, and as such, at 308, transmit another HICH NACK to UE 112 indicating that the first retransmission signal failed to decode.

In some aspects, at 309, the UE 112 may optionally continue to transmit retransmission signals of the first transmission signal to network entity 113. For example, at 310, in response to receiving the previous HICH NACK, UE 112 may transmit a second retransmission signal with RSN set to 2 to network entity 113. Once again, network entity 113 may fail to decode the signal, and as such, at 312, transmit another HICH NACK to UE 112 indicating that the first retransmission signal failed to decode. Subsequently, at 314, UE 112 may transmit a third retransmission signal to network entity 113, and at 316, network entity 113 may transmit another HICH NACK indicating that network entity 113 failed to decode the signal. In certain instances, UE 112 may optionally transmit subsequent retransmissions, and after the third retransmission (if the first two retransmission attempts have failed), the RSN is not incremented anymore and the data packets have RSN maintain its value at three.

At 318, UE 112 may determine that the first retransmission signal for the first transmission signal fails decoding at the network entity 113. As such, UE 112 may prevent transmission of any additional retransmission signals after the first retransmission signal (e.g., at 306). At 320, UE 112 may transmit a new transmission signal corresponding to the first transmission signal. In other words, the first transmission signal is retransmitted as a new transmission signal instead of a retransmission signal by including a systematic bit corresponding to a bit on an E-DPCCH indicating. Additionally, the new transmission signal may be transmitted in a next HARQ occasion. As a result of transmitting a new transmission and not a retransmission, network entity 113 may properly receive and decode the data packet units of the new transmission signal corresponding to the first transmission signal.

As used in this application, the terms "component," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

Several aspects of improved measurement event reporting message associated with a tune away have been presented with reference to a WCDMA and GSM systems. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for".

What is claimed is:

1. A method of mitigating throughput degradation during wireless communications, comprising:
    determining that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy;
    determining whether a first retransmission signal for the first transmission signal fails decoding at the network entity; and
    retransmitting the first transmission signal as a new transmission signal when a determination is made that the first retransmission signal for the first transmission signal fails decoding at the network entity, wherein the new transmission signal includes a systematic bit corresponding to a bit on an enhanced dedicated physical control channel (E-DPCCH) indicating that the new transmission signal is a new transmission and not a retransmission.

2. The method of claim 1, wherein retransmitting the first transmission signal as a new transmission signal comprises preventing transmission of any additional retransmission signals after the first retransmission signal when the determination is made that the first retransmission signal for the first transmission signal fails decoding at the network entity.

3. The method of claim 1, wherein the new transmission signal is transmitted in a next HARQ occasion.

4. The method of claim 1, wherein TX blanking comprises disabling transmissions of a first DSDA subscription for a period of time during transmissions of a second DSDA subscription.

5. The method of claim 4, wherein the first DSDA subscription is associated with a Wideband Code Division Multiple Access (WCDMA) network and the second DSDA subscription is associated with a Global System for Mobile Communications (GSM) network.

6. The method of claim 1, wherein incremental redundancy comprises transmitting a different set of coded bits in each subsequent retransmission.

7. The method of claim 1, wherein the first transmission signal corresponds to a first enhanced dedicated channel (EDCH) transmission signal on HARQ.

8. The method of claim 7, wherein determining that the first transmission signal fails decoding at the network entity further comprises receiving a negative acknowledgment (NACK) from the network entity in response to transmitting the first EDCH transmission signal.

9. An apparatus for mitigating throughput degradation during wireless communications, comprising:
    a memory configured to store data, and
    one or more processors communicatively coupled with the memory, wherein the one or more processors and the memory are configured to:
        determine that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy;
        determine whether a first retransmission signal for the first transmission signal fails decoding at the network entity; and
        retransmit the first transmission signal as a new transmission signal when a determination is made that the first retransmission signal for the first transmission signal fails decoding at the network entity, wherein the new transmission signal includes a systematic bit corresponding to a bit on an enhanced dedicated physical control channel (E-DPCCH) indicating that the new transmission signal is a new transmission and not a retransmission.

10. The apparatus of claim 9, wherein the one or more processors and the memory configured to retransmit the first transmission signal as a new transmission signal are further configured to prevent transmission of any additional retransmission signals after the first retransmission signal when the deteiniination is made that the first retransmission signal for the first transmission signal fails decoding at the network entity.

11. The apparatus of claim 9, wherein the new transmission signal is transmitted in a next HARQ occasion.

12. The apparatus of claim 9, wherein TX blanking comprises disabling transmissions of a first DSDA subscription for a period of time during transmissions of a second DSDA subscription.

13. The apparatus of claim 12, wherein the first DSDA subscription is associated with a Wideband Code Division Multiple Access (WCDMA) network and the second DSDA subscription is associated with a Global System for Mobile Communications (GSM) network.

14. The apparatus of claim 9, wherein incremental redundancy comprises transmitting a different set of coded bits in each subsequent retransmission.

15. The apparatus of claim 9, wherein the first transmission signal corresponds to a first enhanced dedicated channel (EDCH) transmission signal on HARQ.

16. The apparatus of claim 15, wherein the one or more processors and the memory configured to determine that the first transmission signal fails decoding at the network entity further are further configured to receive a negative acknowledgment (NACK) from the network entity in response to transmitting the first EDCH transmission signal.

17. An apparatus for mitigating throughput degradation during wireless communications, comprising:
means for determining that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy;
means for determining whether a first retransmission signal for the first transmission signal fails decoding at the network entity; and
means for retransmitting the first transmission signal as a new transmission signal when a determination is made that the first retransmission signal for the first transmission signal fails decoding at the network entity, wherein the new transmission signal includes a systematic bit corresponding to a bit on an enhanced dedicated physical control channel (E-DPCCH) indicating that the new transmission signal is a new transmission and not a retransmission.

18. The apparatus of claim 17, wherein the means for retransmitting the first transmission signal as a new transmission signal comprises means for preventing transmission of any additional retransmission signals after the first retransmission signal when the determination is made that the first retransmission signal for the first transmission signal fails decoding at the network entity.

19. The apparatus of claim 17, wherein the new transmission signal is transmitted in a next HARQ occasion.

20. The apparatus of claim 17, wherein TX blanking comprises disabling transmissions of a first DSDA subscription for a period of time during transmissions of a second DSDA subscription.

21. The apparatus of claim 20, wherein the first DSDA subscription is associated with a Wideband Code Division Multiple Access (WCDMA) network and the second DSDA subscription is associated with a Global System for Mobile Communications (GSM) network.

22. A computer-readable medium storing computer executable code for mitigating throughput degradation during wireless communications, comprising:
code for determining that a first transmission signal fails decoding at a network entity due to transmit (TX) blanking when a user equipment (UE) supports dual subscriber identity module dual active (DSDA) and is operating in hybrid automatic repeat request (HARQ) with incremental redundancy;
code for determining whether a first retransmission signal for the first transmission signal fails decoding at the network entity; and
code for retransmitting the first transmission signal as a new transmission signal when a determination is made that the first retransmission signal for, the first transmission signal fails decoding at the network entity, wherein the new transmission signal includes a systematic bit corresponding to a bit on an enhanced dedicated physical control channel (E-DPCCH) indicating that the new transmission signal is a new transmission and not a retransmission.

23. The computer-readable medium of claim 22, wherein the code for retransmitting the first transmission signal as a new transmission signal comprises code for preventing transmission of any additional retransmission signals after the first retransmission signal when the determination is made that the first retransmission signal for the first transmission signal fails decoding at the network entity.

24. The computer-readable medium of claim 22, wherein the new transmission signal is transmitted in a next HARQ occasion.

25. The computer-readable medium of claim 22, wherein TX blanking comprises disabling transmissions of a first DSDA subscription for a period of time during transmissions of a second DSDA subscription.

26. The computer-readable medium of claim 25, wherein the first DSDA subscription is associated with a Wideband Code Division Multiple Access (WCDMA) network and the second DSDA subscription is associated with a Global System for Mobile Communications (GSM) network.

* * * * *